C. F. OFENSEND.
METHOD OF BUILDING CORD TIRES.
APPLICATION FILED MAY 6, 1921.

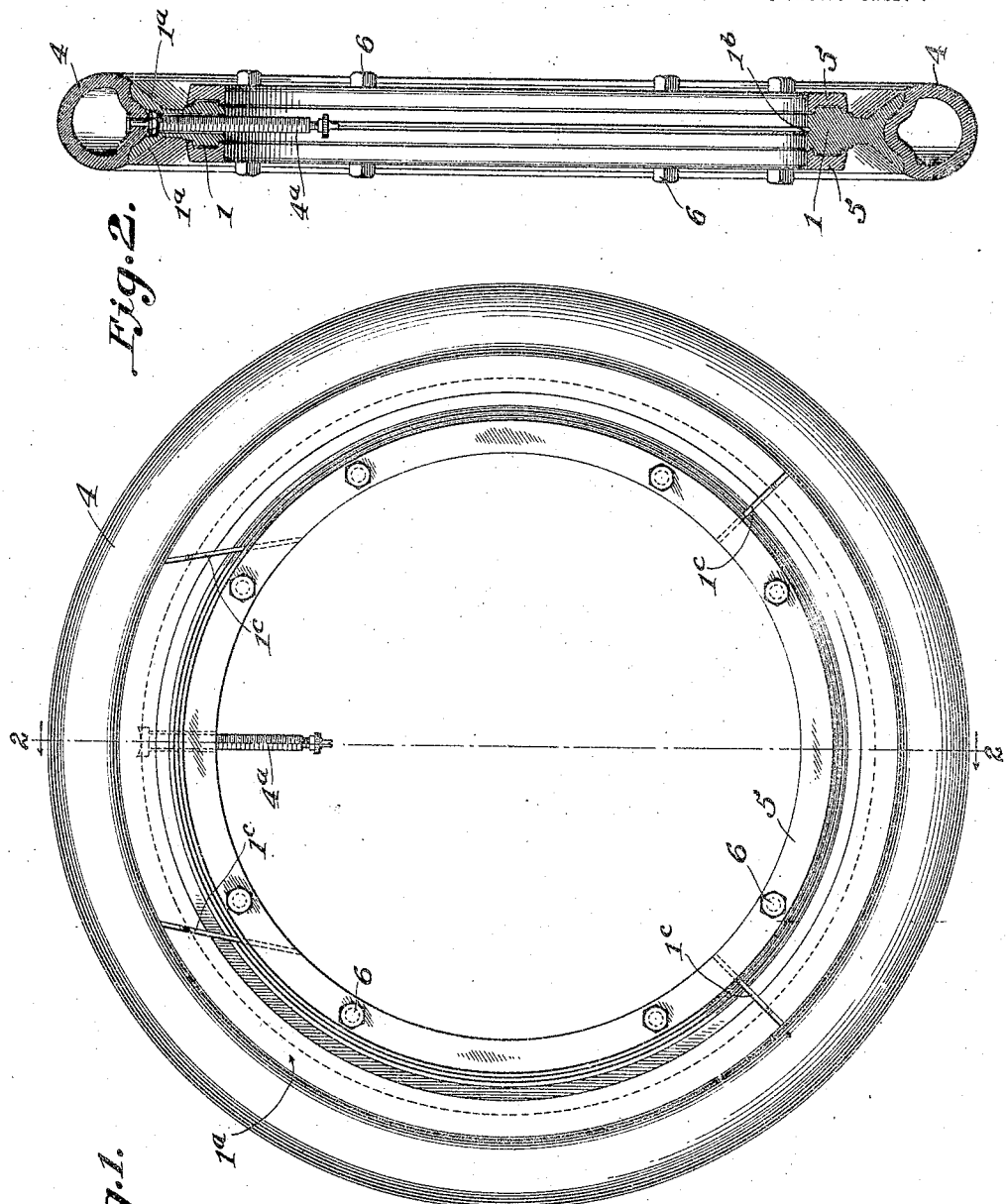

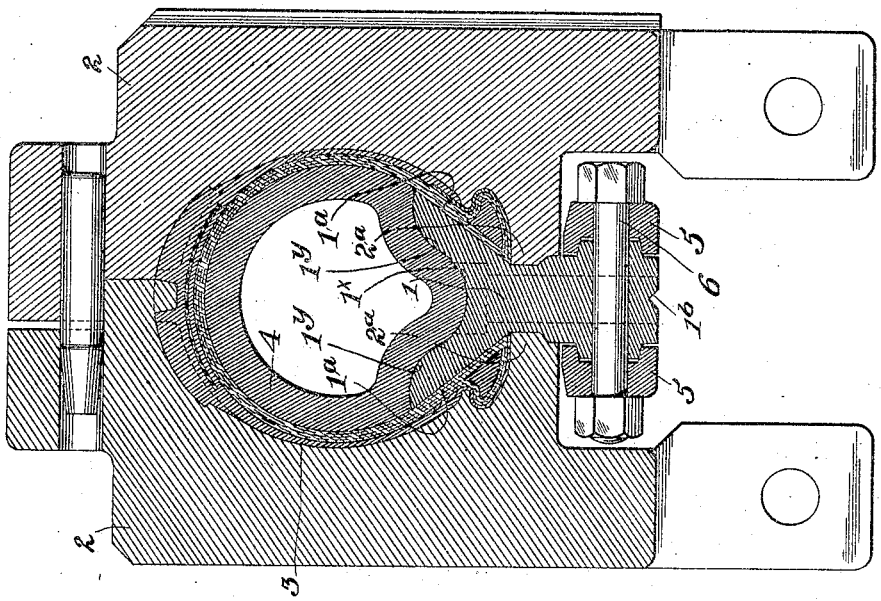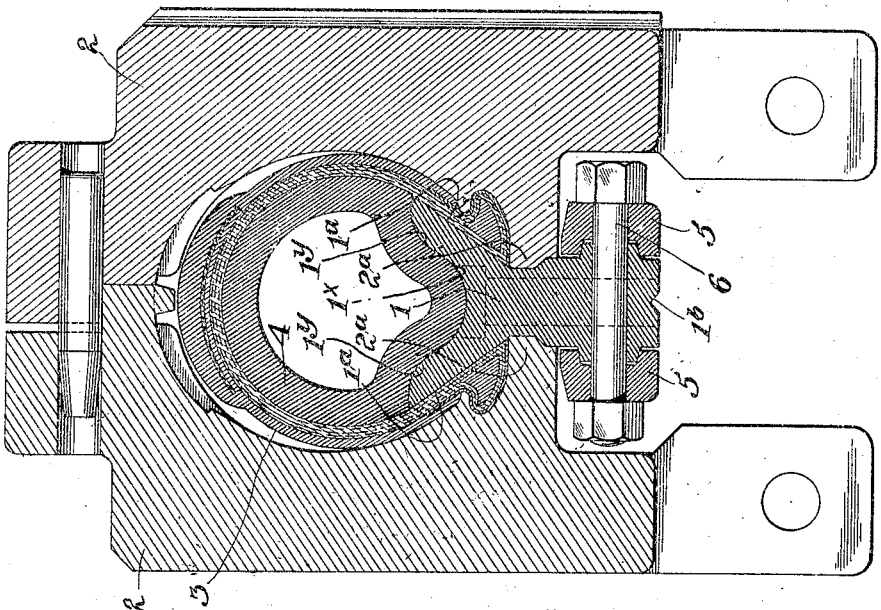

1,388,747.

Patented Aug. 23, 1921.

Inventor:
Chase F. Ofensend,
by Spear Middleton Donaldson & Hall
Attys.

UNITED STATES PATENT OFFICE.

CHASE F. OFENSEND, OF AKRON, OHIO, ASSIGNOR TO THE MILLER RUBBER COMPANY, OF AKRON, OHIO, A CORPORATION OF OHIO.

METHOD OF BUILDING CORD TIRES.

1,388,747.     Specification of Letters Patent.     Patented Aug. 23, 1921.

Application filed May 6, 1921. Serial No. 467,413.

*To all whom it may concern:*

Be it known that I, CHASE F. OFENSEND, a citizen of the United States, and resident of Akron, Ohio, have invented certain new and useful Improvements in Methods of Building Cord Tires, of which the following is a specification.

My present invention relates to improvements in the method of manufacturing cord tires.

Heretofore, in the manufacture of such tires, it has been customary to apply the tire forming material, including the cord structure or cord fabric, to or build it upon a metal core, and, after it is properly formed, to remove the carcass from the core. An expansible air bag of ring form is then inserted in the carcass, which latter is placed in the mold and the bag inflated to stretch the cord fabric and cause the carcass to snugly fit the mold.

This method of procedure has many objections, including the extra work required in removing the core from the unvulcanized tire body, and the insertion of the air bag therein, which it is the object of the present invention to avoid.

The invention includes the novel method as hereinafter described and particularly defined by the appended claims.

In the drawing—

Figure 1 is a side elevation of the core.

Fig. 2 is a section on line 2—2 of Fig. 1.

Fig. 3 is an enlarged transverse section through one side of the core with the tire thereon in position within a mold before stretching the tire, and Fig. 4 is a similar view with the core bag expanded to stretch the tire.

Figure 5:
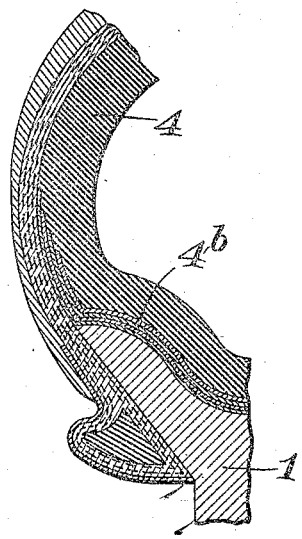

Figs. 5 to 8 inclusive are detail views of modifications.

For carrying out my improved method, I provide an elastic core upon which the tire is built, which core comprises a ring shaped member 1 having a relatively narrow inwardly extending web shaped on its opposite faces to receive the portions $2^a$ of the mold sections 2. The ring member 1 has outwardly flaring walls $1^a$ shaped to give the proper formation to the inner faces of the edge portions of the tire, which tire is indicated by the numeral 3.

The ring 1 is provided with a peripheral seat, preferably of substantially the shape shown, including a central concave portion $1^x$ merging into the convex portions $1^y$ upon which an endless elastic inflatable tube 4 is mounted.

This is provided with an inflating tube $4^a$ passing through an opening in the ring and adapted to be detachably connected to any suitable source of supply of fluid (such as air) under pressure.

The ring, web or flange is provided at its inner edge with a groove $1^b$ designed to be engaged by the ends of the arms of the customary tire building chuck in the manner well understood by those skilled in the art.

As the majority of cord tires manufactured are of the inextensible edge or quick detachable type embodying inextensible bead rings in their edges, I make the ring 1 in the form of a sectional ring, or in other words, divide such ring into sections on lines indicated at $1^c$ in Fig. 1, and secure such ring sections in abutting position by suitable means engaging the inner portion of the web which lies within the inner face of the mold, as shown in Figs. 3 and 4.

Such means may conveniently take the form of clamping rings 5 held against opposite faces of such web by bolts 6.

In proceeding to carry out my improved method, I expand the bag, mounted on the ring, as shown in Figs. 1 and 2, to the proper size, to conform to the size of tire to be built thereon, using a templet to determine when the core bag has been expanded to the proper degree. The core being mounted on a suitable chuck, I proceed to apply the tire forming material thereto in the usual or any approved manner, and when the material is all assembled thereon, I place the core with the tire thereon in a mold, as indicated in Fig. 3. After the mold is closed, the core bag is inflated to stretch the cord fabric and expand the tire from the position shown in Fig. 3 to that shown in Fig. 4, and thereafter the pressure is maintained during the vulcanization of the tire by heat applied to the mold in the customary manner. After vulcanization is complete the mold is opened, the core removed from the tire and a fresh tire built thereon.

To obviate any separation of the bag from the metal part 1 due to distortion of the bag by air pressure I make the bag with quite thick walls as shown, which, in connection with the form of sheet shown, prevents any danger of separation.

Figure 6:
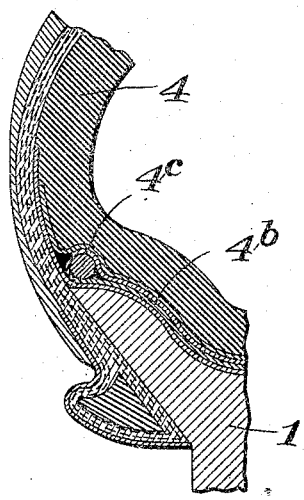

As a further guard against separation, I may provide the inner annular face of the tube, or that portion adjacent the core ring 1, with reinforcing layers of fabric, as indicated at 4ᵇ, as shown in Fig. 5, and may provide a further reinforcement in the shape of an embedded wire bead 4ᶜ, as shown in Fig. 6.

Figure 7:
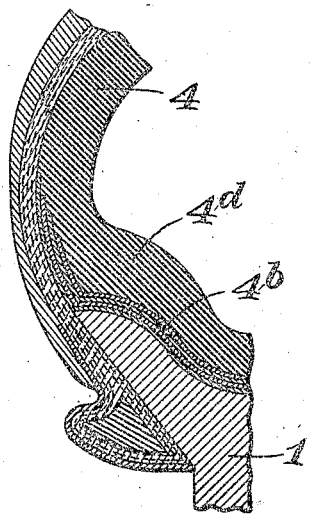

Another manner of securing this result is shown in Fig. 7, in which the walls of the bag adjacent the edges of the core ring are made much thicker, as indicated at 4ᵈ.

Figure 8:
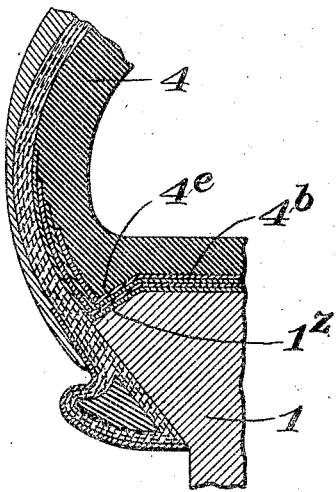

Still another modification is shown in Fig. 8, in which the side edges of the core ring are chamfered or reversely beveled, as indicated at 1ᶻ, and the bag correspondingly shaped, providing the thickened portion 4ᵉ.

Having thus described my invention, what I claim is:

1. The hereindescribed method of manufacturing cord tires which consists in applying the tire material, including the cord structure, to an inflated elastic core, placing the core with the tire material carried thereby in a closed mold, subjecting the core to increased internal pressure to stretch the tire material, and subjecting it to vulcanizing heat while so expanded.

2. The hereindescribed method of manufacturing cord tires which consists in applying the tire material, including the cord structure, to an inflated elastic core, placing the core with the tire material carried thereby in a closed mold, having an internal diameter exceeding the external diameter of the tire, subjecting the core to increased internal pressure to stretch the tire material and cause it to expand to fill the mold cavity, and subjecting it to vulcanizing heat while so expanded.

In testimony whereof, I affix my signature.

CHASE F. OFENSEND.